United States Patent Office 3,839,358
Patented Oct. 1, 1974

3,839,358
PROCESS FOR THE PREPARATION OF
BIS-MALEIMIDES
Michel Bargain, Lyon, France, assignor to
Rhone-Poulenc S.A., Paris, France
No Drawing. Filed Aug. 10, 1970, Ser. No. 62,623
Claims priority, application France, Aug. 12, 1969,
6927717
Int. Cl. C07d 27/18
U.S. Cl. 260—326.26          10 Claims

ABSTRACT OF THE DISCLOSURE

In making bis-maleimides by reaction of a bismaleamic acid with a lower carboxylic acid anhydride in the presence of a tertiary amine and of a liquid organic diluent, a nickel derivative is used as catalyst, and the amount of tertiary amine is 0.2–1 mol per mol of bismaleamic acid. A very rapid reaction can be achieved, with a reduction in the proportion of by-products formed.

---

The present invention relates to the preparation of bis-maleimides from the corresponding bis-maleamic acids.

It is known that maleamic acids, whose molecule contains at least one group of formula

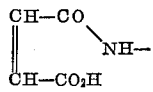
$$\tag{I}$$

can undergo a cyclising dehydration with formation of the corresponding maleimide, under the influence of chemical agents.

Thus it has been proposed in U.S. Pat. No. 2,444,536 to prepare $m$-phenylene-bis-maleimide by this method, using acetic anhydride as the dehydrating agent and carrying out the process in the presence of sodium acetate.

It is also known (U.S. Pats. Nos. 3,018,290 and 3,018,292) to effect the cyclising dehydration of maleamic acids by means of a carboxylic acid anhydride or carboxylic acid chloride in the presence of at least 2 mols of a tertiary amine per mol of maleamic acid.

Finally, it has also been proposed (U.S. Pat. No. 3,127,414) to prepare N,N'-$m$-phenylene-bis-maleimide by reacting the corresponding bis-maleamic acid with acetic anhydride in the presence of sodium acetate in a polar organic solvent.

The present invention consists in a process for the preparation of bis-maleimides, which comprises effecting reaction between a bis-maleamic acid and a lower carboxylic acid anhydride in the presence of a tertiary amine, an organic diluent and a catalyst consisting of a nickel derivative which is soluble in the liquid phase of the reaction mixture, from 0.2 to 1.2 mols of tertiary amine being used per mol of bis-maleamic acid.

It is possible, by using this process, to achieve a very rapid cyclising dehydration of the bis-maleamic acids, and to restrict considerably the proportion of undesirable by-products, which are a serious handicap to the subsequent purification of the bis-maleimides.

The bis-maleamic acids used are preferably those represented by the general formula:

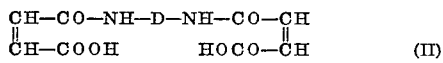
$$\tag{II}$$

in which D represents a divalent radical containing at least two carbon atoms, which can be aliphatic, cycloaliphatic, aromatic or heterocyclic in nature.

More specifically, D can be a linear or branched alkylene radical having from 2 to 12 carbon atoms, a phenylene, cyclohexylene,

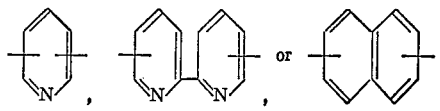

radical, or a plurality of phenylene or cyclohexylene radicals linked to one another by a simple valency bond or by an atom or group which is inert under the cyclising conditions, such as —O—, —S—, an alkylene group with 1 to 3 carbon atoms, —CO—, —SO$_2$—, —NR$_1$—, —N=N—, —CONH—, —COO—, —P(O)R$_1$—,

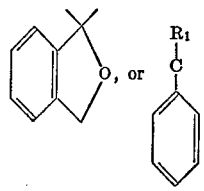

wherein R$_1$ represents a hydrogen atom, an alkyl radical with 1 to 4 carbon atoms, or a phenyl or cyclohexyl radical. The various phenylene or cyclohexylene radicals can be substituted by methyl groups.

By way of specific examples of bis-maleamic acids which can be used as starting materials in the present process there may be quoted:

N,N'-ethylene-bis-maleamic acid,
N,N'-hexamethylene-bis-maleamic acid,
N,N'-$m$-phenylene-bis-maleamic acid,
N,N'-$p$-phenylene-bis-maleamic acid,
N,N'-4,4'-diphenylmethane-bis-maleamic acid,
N,N'-4,4'-diphenyl ether-bis-maleamic acid,
N,N'-4,4'-diphenyl-sulphone-bis-maleamic acid,
N,N'-4,4'-dicyclohexylmethane-bis-maleamic acid,
N,N'-4,4'-diphenylsulphide-bis-maleamic acid,
N,N'-$m$-xylene-bis-maleamic acid,
N,N'-4,4'-diphenyl-1,1-cyclohexane-bis-maleamic acid,
N,N'-1,4-cyclohexylene-bis-maleamic acid,
N,N'-2,6-pyridine-bis-maleamic acid,
N,N'-4,4'-diphenylene-bis-maleamic acid,
N,N'-6,6'-dipyridyl-bis-maleamic acid,
N,N'-1,5-naphthylene-bis-maleamic acid,
N,N'-4,4'-dicyclohexylpropane-bis-maleamic acid,
N,N'-4,4'-benzophenone-bis-maleamic acid,
N,N'-4,4'-triphenylphosphine-oxide-bis-maleamic acid,
N,N'-4,4'-methyldiphenylamine-bis-maleamic acid,
N,N'-4,4'-azobenzene-bis-maleamic acid,
N,N'-4,4'-triphenylmethane-bis-maleamic acid,
N,N'-4,4'-phenyl-benzoate-bis-maleamic acid,
N,N'-4,4'-benzanilide-bis-maleamic acid and
N,N'-4,4'-diphenyl-1,1-phthalane-bis-maleamic acid.

The maleamic acids used can be prepared by known processes, for example as described in "Maleic Anhydride Derivatives" by L. A. Flett and W. H. Gardner. In one advantageous embodiment of the invention a suspension of a maleamic acid obtained by reaction of maleic anhydride with a di-primary diamine in an organic diluent suitable in itself for use in the process of the invention is used directly, without isolating the maleamic acid.

As the lower carboxylic acid anhydride, acetic anhydride is preferably used. Advantageously at least two mols of anhydride per mol of bis-maleamic acid are used, larger amounts, especially 2.1 to 3 mols per mol of bis-maleamic acid, being generally preferred.

Amongst the suitable tertiary amines, there can be mentioned especially the trialkylamines as well as the N,N-dialkylbenzylamines in which the alkyl radicals have from 1 to 12 carbon atoms. Triethylamine and N,N-dimethylbenzylamine are advantageously employed. The preferred amounts of tertiary amine are between 0.3 and 1 mol per mol of bis-maleamic acid.

The reaction is effected in an organic diluent which is liquid under the working conditions, which are in practice a temperature between 0° and 100° C., and advantageously 50°–80° C., and preferably atmospheric pressure. Among the diluents which can be used as solvents of high polarity such as dimethylformamide, dimethylacetamide, dimethylsulphoxide, N-methylpyrrolidone, and N-methylcaprolactam; cyclic ethers such as tetrahydrofurane and dioxane; and dialkylketones such as acetone and methyl ethyl ketone, which are particularly advantageous. An amount of diluent from 1 to 4 times the weight of the maleamic acid employed is generally very suitable.

Examples of nickel derivatives which can be used as catalysts include nickel salts such as the chloride, carbonate, acetate, formate, nitrate, phosphate, sulphate, and stearate, optionally in the hydrated form, as well as the complexes of divalent nickel as described for example by Pascal—New Treatise of Inorganic Chemistry—Volume 18—published by Masson and Co. Amongst these complexes, the internal complexes and the tetracoordinated and hexacoordinated ionic complexes may more especially be referred to. The catalysts can be used in very small amounts, of the order of 1 to 10 mmols per mol of bis-maleamic acid.

In a preferred procedure for carrying out the process, the catalyst, the tertiary amine and the anhydride are added to a mixture of the maleamic acid and the diluent, preferably with agitation as by stirring, and the mixture is then allowed to react at the selected temperature. If, at this stage, the diluent dissolves the bis-maleimide formed, it can advantageously be precipitated by adding a non-solvent such as water and may then be isolated in accordance with the customary methods; the volume of water used for this purpose is preferably 0.5 to 3 times the volume of diluent employed.

The Examples which follow illustrate the invention.

Example 1

39.4 g. (0.1 mol) of a bis-maleamic acid of formula

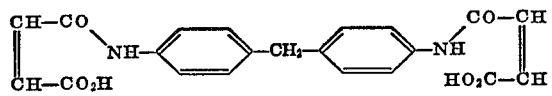

are suspended in 98.8 g. of acetone in a flask equipped with a reflux condenser, and 0.2 g. ($8 \times 10^{-4}$ mols) of nickel acetate tetrahydrate, 5.84 g. (0.0577 mol) of triethylamine and 25.4 g. of acetic anhydride are then added with stirring.

The flask containing the mixture is immersed in a bath of liquid heated to 65° C.; after 14 minutes, a clear solution is obtained, which is kept at this temperature for 1 hour and then cooled to 5° C. 125 g. of water are added to the cooled solution, and the solid which precipitates is filtered off. This precipitate is washed with water and then with an aqueous sodium bicarbonate solution, and finally rinsed with water. After drying at 60° C. under a pressure of 5 mm. of mercury, 31 g. of N,N'-4,4'-diphenylmethane-bis-maleimide, melting at 156° C. are obtained. The yield is 87%, on the bis-maleamic acid starting material.

Example 2

The apparatus described in the preceding Example is used.

0.45 g. ($17.5 \times 10^{-4}$ mols) of nickel acetylacetonate followed by 15.3 g. (0.151 mol) of triethylamine and 63.5 g. of acetic anhydride are added, with stirring, to a suspension of 98.5 g. (0.25 mol) of the same bis-maleamic acid as in Example 1 in 248 g. of acetone.

The flask containing the mixture is immersed in a liquid maintained at 70° C.; after 15 minutes, a solution is obtained which is treated as in Example 1, except that the amount of water added is 310 g. (77.5 g. of N,N'-4,4'-diphenylmethane-bis-maleimide melting at 155° C. are finally obtained, the yield on the bis-maleamic acid starting material being 86.5%.

The suspension of bis-maleamic acid used in this Example was obtained directly as follows:

A solution of 49.5 g. of 4,4'-diamino-diphenylmethane in 104 g. of acetone is introduced into a solution prepared from 51.5 g. of maleic anhydride and 144 g. of acetone over the course of 30 minutes whilst stirring, and the mixture is then stirred for a further 30 minutes.

Example 3

A series of experiments differing in the nature of the nickel derivative used as the catalyst is carried out under the conditions described in Example 1, except that the amount of water added to the cooled solution is 140 g. instead of 125 g.

The following Table summarises the particular features of each experiment and the results obtained.

| Nature of the catalyst | Weight of catalyst (g.) | Duration of heating until dissolved (minutes) | Yield of bis-maleimide (percent) | Melting point of the bis maleimide degree |
|---|---|---|---|---|
| NiCl$_2$·6H$_2$O | 0.19 | 15 | 86.5 | 156 |
| NiCO$_3$ | 0.095 | 38 | 77.4 | 156 |
| (nickel bis-dithiocarbamate complex structure) | 0.23 | 15 | 86.8 | 156 |
| (nickel bis-benzoyl complex structure) | 0.22 | 24 | 84.7 | 156 |

| Nature of the catalyst | Weight of catalyst (g.) | Duration of heating until dissolved (minutes) | Yield of bis-maleimide (percent) | Melting point of the bis maleimide degree |
|---|---|---|---|---|
| 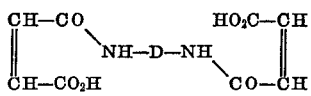 | 0.4 | 33 | 83.7 | 155 |
| 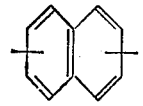 | 0.12 | 15 | 89.4 | 156 |

Example 4

2 g. of nickel acetate tetrahydrate, 58.3 g. of triethylamine and then 254 g. of acetic anhydride are added with stirring to a suspension of 304 g. of a bis-maleamic acid of formula

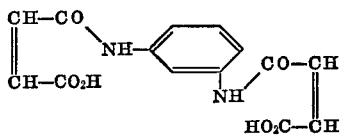

in 960 g. of acetone. The whole is heated to 70° C.; after 20 minutes, a solution is obtained which is kept at 58°–60° C. for 1 hour and is then cooled to 10° C. The mixture is thereafter treated as in Example 1, the amount of water added to the solution being 2400 g. 233.4 g. of N,N'-*m*-phenylene-bis-maleimide melting at 204° C. are obtained, the yield on the bis-maleamic acid starting material being 87%.

The suspension of the bis-maleamic acid was obtained directly as follows:

A solution of 108 g. of *m*-phenylenediamine in 160 g. of acetone is introduced with stirring, over the course of 45 minutes, into a solution prepared from 208 g. of maleic anhydride and 800 g. of acetone, and the mixture is then left to stir for a further 1 hour.

Example 5

0.2 g. of nickel acetate tetrahydrate, 5.84 g. of triethylamine and 25.4 g. of acetic anhydride are added, with stirring, to a suspension of 42.2 g. of a bis-maleamic acid of formula

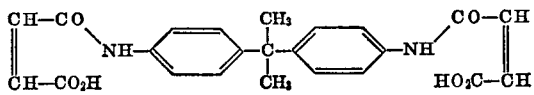

obtained directly from 20.6 g. of maleic anhydride, 22.6 g. of 4,4'-diamino-diphenylpropane and 100 g. of acetone. After heating to 60° C. for 15 minutes, a solution is obtained which is kept at the same temperature for 1 hour and then cooled to 15° C. The bis-maleimide is precipitated by adding 240 g. of water and is then treated as in Example 1.

36.6 g. of N,N'-4,4'-diphenylpropane - bis - maleimide melting at 221° C. are obtained, the yield on the bis-maleamic acid starting material being 94%.

The bis-maleimides obtained by the process of the invention can be used, for example, in the production of cross-linked resins by reaction with a diamine as described in United States Application Serial No. 743,025 (issued as U.S. Pat. No. 3,562,223 on Feb. 9, 1971) of Bargain *et al.*

We claim:

1. In a process for the preparation of bis-maleimides, which comprises effecting reaction between a bis-maleamic acid which has the general formula $$\begin{array}{c} \text{CH–CO} \\ \| \\ \text{CH–CO}_2\text{H} \end{array} \diagdown \text{NH–D–NH} \diagup \begin{array}{c} \text{HO}_2\text{C–CH} \\ \| \\ \text{CO–CH} \end{array}$$

in which D has one of the following meanings:
a linear or branched alkylene radical of 2–12 carbon atoms;
phenylene; cyclohexylene;

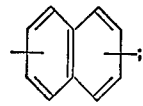

a plurality of phenylene or cyclohexylene radicals linked by a simple valency bond or by an atom or group which is inert under the reaction conditions; and a lower carboxylic acid anhydride in the presence of a tertiary amine and an organic diluent which is liquid under the reaction conditions, the improvement wherein the reaction is carried out in the presence of a catalytic amount of a catalyst consisting of a nickel salt or divalent nickel complex which is soluble in the liquid phase of the reaction mixture, from 0.2 to 1 mole of tertiary amine being used per mole of bis-maleamic acid.

2. Process according to claim 1 in which D represents a linear or branched alkylene radical of 2–12 carbon atoms, phenylene, cyclohexylene,

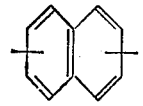

or a plurality of phenylene or cyclohexylene radicals linked to one another by a simple valency bond or a —O—, —S—, an alkylene group with 1 to 3 carbon atoms, —CO—, —SO$_2$—, —NR$_1$—, —N=N—, —CONH—, —COO—, —P(O)R$_1$—,

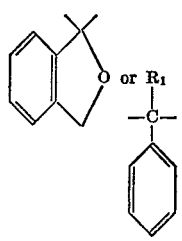

wherein $R_1$ represents a hydrogen atom, an alkyl radical with 1 to 4 carbon atoms, or a phenyl or cyclohexyl radical.

3. Process according to claim 1 in which the carboxylic acid anhydride is acetic anhydride.

4. Process according to claim 1, in which the tertiary amine is triethylamine.

5. Process according to claim 1, in which the tertiary amine is N,N-dimethylbenzylamine.

6. Process according to claim 1, in which from 1 to 10 mmols of catalyst is used per mol of bis-maleamic acid.

7. Process according to claim 1, in which the reaction is effected at a temperature of 0°–100° C.

8. Process according to claim 7, in which the reaction is effected at a temperature of 50°–80° C.

9. Process according to claim 7, in which a dialkyl ketone is used as the diluent.

10. Process according to claim 1, in which the catalyst, the tertiary amine and the carboxylic acid anhydride are added to a mixture of the bis-maleamic acid and the diluent, and the mixture is kept at the reaction temperature until the cyclising dehydration reaction is substantially complete.

References Cited
UNITED STATES PATENTS 3,018,290   1/1962   Sauers et al. _____ 260—326.3

JOSEPH A. NARCAVAGE, Primary Examiner

U.S. Cl. X.R.

252—472; 260—295 PA, 295 D